(No Model.) 2 Sheets—Sheet 1.
E. A. HINE.
CYCLE BRAKE.
No. 581,005. Patented Apr. 20, 1897.
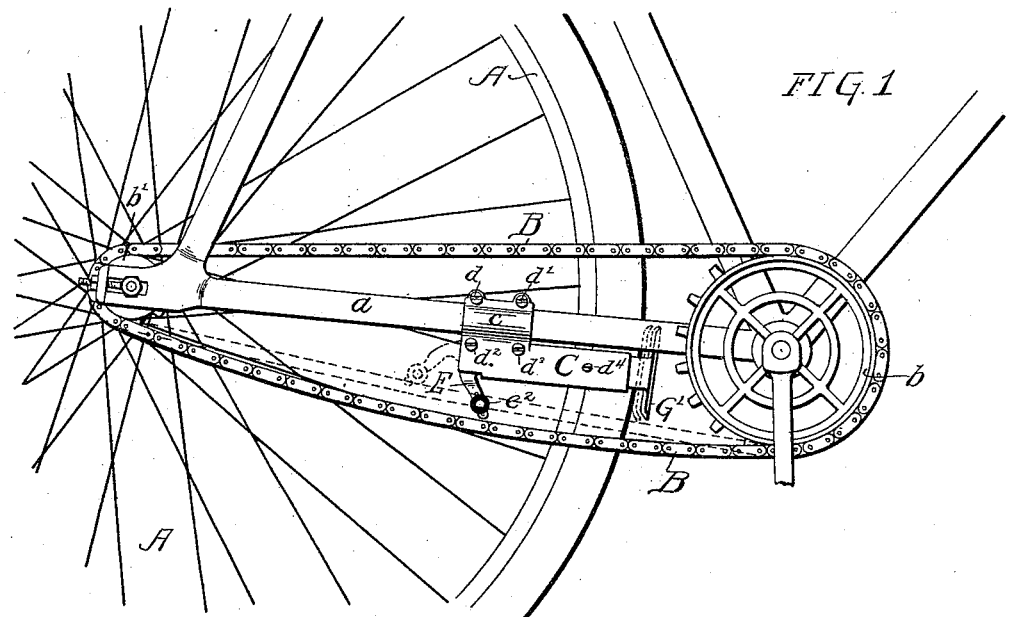
FIG. 1
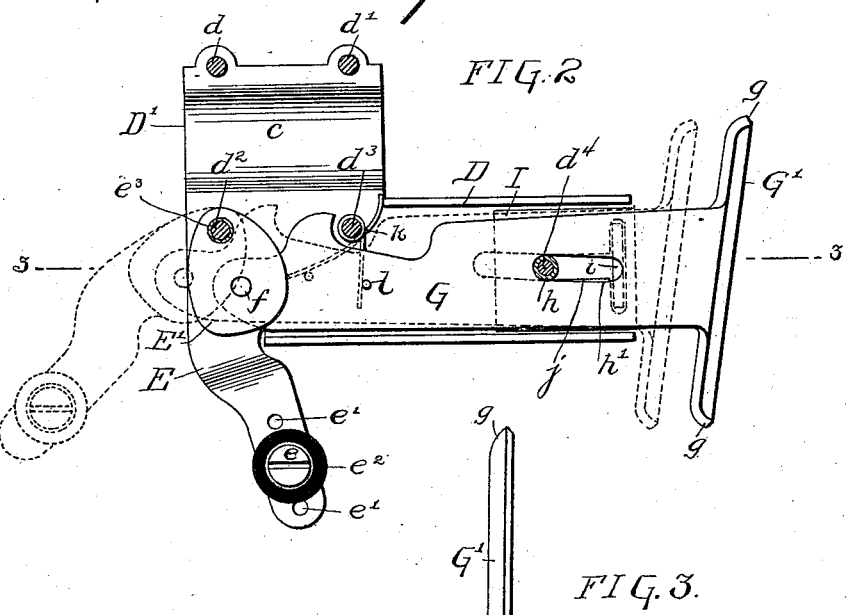
FIG. 2
FIG. 3.
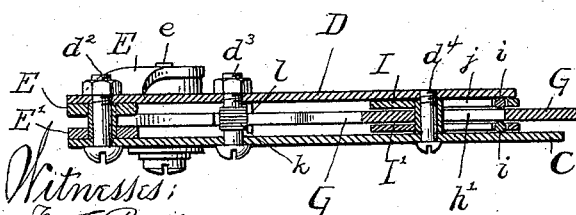
Witnesses:
Jno. C. Parker
Wm. A. Pike
Inventor:
Edward A. Hine
By his Attorney.

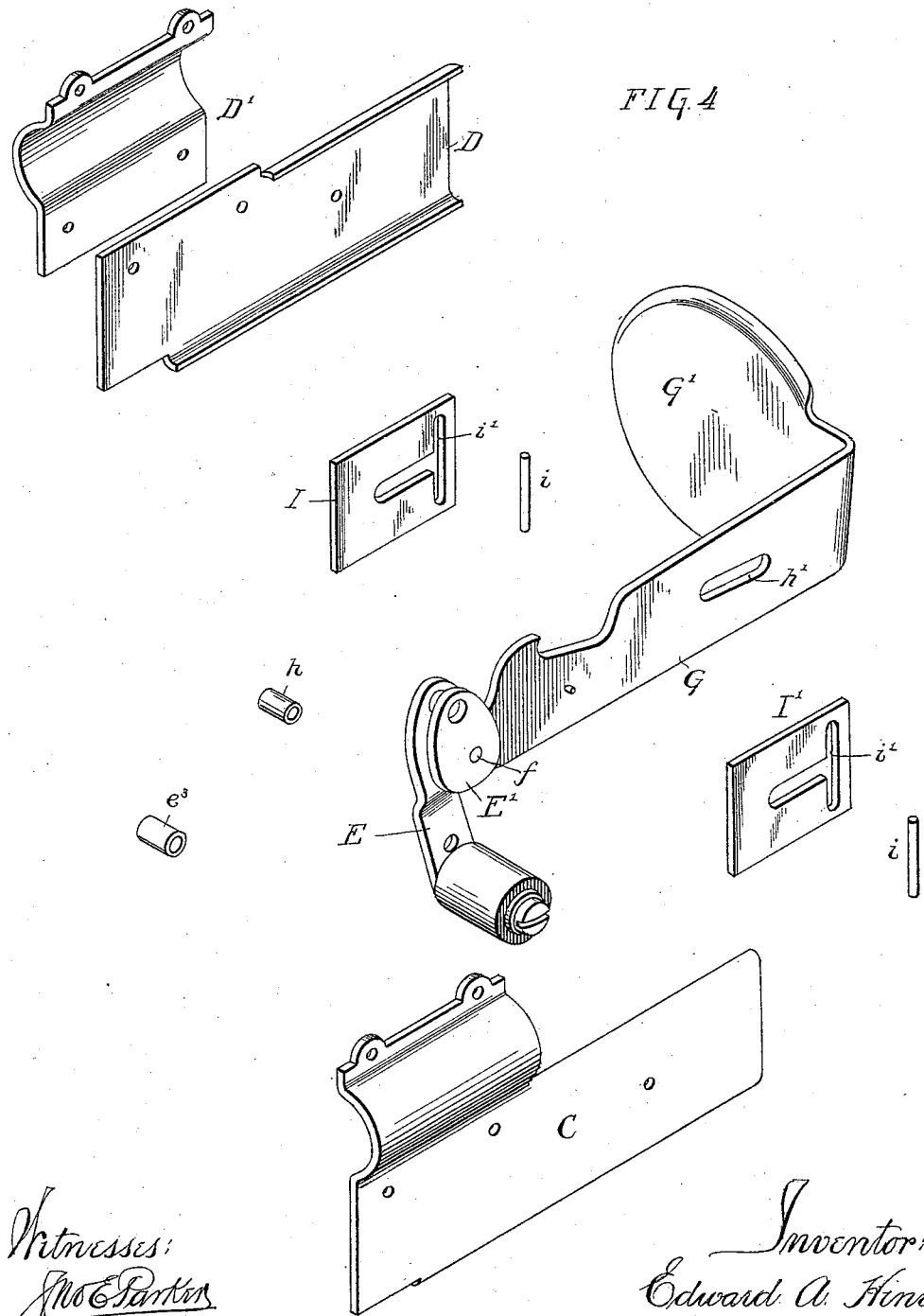

UNITED STATES PATENT OFFICE.

EDWARD A. HINE, OF NEW YORK, N. Y.

CYCLE-BRAKE.

SPECIFICATION forming part of Letters Patent No. 581,005, dated April 20, 1897.

Application filed October 9, 1896. Serial No. 608,342. (No model.)

*To all whom it may concern:*

Be it known that I, EDWARD A. HINE, a citizen of the United States, and a resident of the city of New York, State of New York, have invented certain new and useful Improvements in Cycle-Brakes, of which the following is a full, clear, and exact description, reference being had to the accompanying drawings, forming part of this specification.

My invention relates to certain improvements in brakes of that class in which a brake-shoe is automatically forced into contact with the periphery of the driving or rear wheel of a bicycle as soon as the rider ceases to propel the wheel forward and attempts to arrest its motion by back-pedaling.

The object of my invention is to provide a brake of this class of simple and cheap construction and which may be applied to any bicycle driven by means of sprocket-wheels and a connecting-chain.

In the accompanying drawings, Figure 1 is an elevation of sufficient of an ordinary bicycle to illustrate the application of my invention. Fig. 2 is a sectional elevation of an automatic brake constructed in accordance with my invention. Fig. 3 is a sectional plan view of the same on the line 3 3, Fig. 2; and Fig. 4 is a view illustrating the principal parts of the brake mechanism detached.

Referring to the drawings, A represents the rear or driving wheel of an ordinary bicycle; $a$, the lower rear bar, extending from the crank-axle bracket to the shaft of the driving-wheel; $b$, the sprocket-wheel of the crank-shaft; $b'$, the sprocket-wheel of the driving-wheel, and B the usual driving-chain. The chain B extends over the two sprocket-wheels, and normally when the bicycle is being propelled the upper portion of the chain is taut and extends in a straight line from one sprocket-wheel to the other, while the lower portion of the same hangs loosely.

When the rider wishes to arrest the forward movement of the machine by back-pedaling, the lower portion of the chain is stretched taut between the two sprocket-wheels, and it is this movement of the chain, together with its travel or movement from the front to the rear, which it is proposed to utilize to apply the brake-shoe to the tire of the rear wheel.

The operative parts of the braking mechanism are contained within a casing formed by three plates C D D', each of the parts C D' having curved portions $c$ adapted to fit over and embrace the lower bracing-bar $a$ of the machine and to hold the brake in proper position, the parts of the casing being clamped to each other and to the bracing-bar by means of bolts $d$, $d'$, $d^2$, $d^3$, and $d^4$. It will be noticed that one side of the casing is formed of two sections D D' for convenience in securing the brake to the bracing-bar, it being simply necessary to remove the nuts of the securing-bolts, and the plate D' may then be taken off without disturbing the operative parts of the brake.

Surrounding the bolt $d^2$ is a sleeve $e^3$, on which is hung a lever E, carrying at its lower end a pin $e$, adapted to any one of a series of orifices $e'$ in the lever. On the pin $e$ is mounted a roller $e^2$, formed of some yielding material, such as rubber, and with which the chain is adapted to come into contact when the brake is to be applied. The pin $e$ may be secured in any one of the openings $e'$ in order to increase or decrease the distance between the roller and the bracing-bar to accommodate machines of different manufactures or machines having higher or lower gearing. To the lever E is secured a plate E' by means of a riveted pin $f$, which serves as a pivot-point for the end of a bar or plate G, the latter being preferably formed of a piece of stamped sheet metal adapted to be guided within the casing and provided at its outer end with an integral brake-shoe G, having rounded or curved edges $g$, in order to prevent the tearing of the tire when the brake-shoe is forced into contact therewith.

The lever E and the plate E' serve to guide and hold the rear end of the plate G centrally within the casing, and excessive friction in the movement of the lever is prevented by the sleeve $e^3$, which covers and surrounds the securing-bolt $d^2$. The plate G is guided near its forward end both vertically and laterally, its vertical guide being formed by a sleeve or collar $h$, surrounding the pin $d^4$ and passing through a slot $h'$ in the bar G, while the lateral guides are formed by antifriction-rollers $i$, adapted to suitable recesses $i'$ within plates I I', placed one on each side of the plate G. In the plates I I' are slots $j$, through which the bolt $d^4$ and its sleeve $h$ pass in order to keep the plates in proper position without, however, interfering with their free movement. The diameter of each of the antifriction-rollers $i$ is greater than the thickness of the plates I I', the recesses in these plates merely serving as guides or seats to hold the rollers in proper position while the peripheries of the rollers are in contact with the inner surfaces of the casing and the sides of the plate G, so that such plate is given great freedom of movement and will not bind or stick within the casing when the brake-shoe is being pressed upon the wheel-tire.

The plate G is normally held in the position illustrated by full lines in Figs. 1 and 2, with the brake-shoe at some little distance from the wheel-tire, by means of a coiled spring $k$, surrounding the bolt $d^3$ and having one end in contact with the casing and its opposite end bearing against a pin $l$ in the plate G and tending to thrust the latter toward the front of the machine.

The operation is as follows: The parts being in the position illustrated in full lines in Figs. 1 and 2 and the machine traveling in a forward direction, the lower portion of the chain B will hang somewhat loosely between the sprocket-wheels $b'$ and $b$ and will not come into contact with the roller $e^2$ so long as the machine is traveling in a forward direction. When the rider commences to resist the rotative movement of the pedal, or, as it is usually called, "back-pedaling," the lower portion of the chain B will almost instantly be stretched taut, and in rising to seek a straight line between the two sprocket-wheels the chain will come into contact with the roller $e^2$, and, owing to the direction of travel of the chain, the roller with its lever E will be carried to the rear, assuming the position shown by dotted lines and pressing the brake-shoe G' into contact with the tire of the rear wheel, the pressure exerted by the brake-shoe on the tire being directly in proportion to the force which the rider exerts in back-pedaling, so that the rider may stop the rotation of the wheel either slowly or quickly by regulating the pressure exerted in back-pedaling.

The braking mechanism described comprises but few parts, nearly all of which may be formed of stamped metal, so that it may be made very cheaply, while at the same time it forms a very effective and powerful brake at all times under the control of the rider.

As nearly every safety-machine is provided with the same relatively-arranged parts, as shown in Fig. 1, this brake may be applied to varying makes of machine by adjusting the roller-pin $e$ in any one of the orifices $e'$ which may be necessary in order to bring it within the range of movement of the lower portion of the driving-chain.

Having thus described my invention, what I claim, and desire to secure by Letters Patent, is—

1. A chain-actuated braking mechanism consisting of a guiding-casing substantially horizontally disposed and means for clamping said casing to the frame of the machine, a brake-shoe, a sliding plate carrying said brake-shoe longitudinally disposed and guided in said casing, a lever pivoted in said casing and connected to said sliding plate the free end adapted to be acted upon by the driving-chain of the machine.

2. A chain-actuated cycle-brake comprising a horizontally-disposed inclosing casing with clamp attachment for securing the casing to the machine, a brake-shoe, a sliding bar provided in said casing integral with said brake-shoe and adapted to reciprocate in said casing, a lever pivoted at one end to said casing having a roller or pin upon its free end adapted to be acted upon by the driving-chain, the inner end of said sliding bar being connected pivotally to said lever and spring provided in said casing to keep the shoe in inoperative position, substantially as described.

3. In a chain-actuated cycle-brake a casing and securing-clamp formed of the plates, C, D, D', having inwardly-projecting portions forming the boxing or casing for inclosing the parts, a brake-shoe, G', a sliding plate, G, integral with said shoe, G', a lever, E, pivoted to the casing at $d^2$, and connected to the inner arm of the sliding plate, G, an actuating-spring, $k$, provided in the casing, a pin, $e$, and roller, $e^2$, provided thereon adjusted to the free end of the lever, E, substantially as described.

4. The combination in a cycle-brake, of a casing adapted to be secured to the cycle-frame, a slotted plate or bar guided within said casing, a pin, $d^4$, having an inclosing sleeve, $h$, extending through the slot in said plate or bar and serving to guide the same, a brake-shoe secured to or formed integral with said plate or bar, a lever pivoted to the casing and operatively connected to said plate or bar, said lever being adapted to be operated upon by the driving-chain of the machine.

5. The combination in a cycle-brake, of a casing adapted to be secured to the cycle-frame, a plate or bar guided within said casing, antifriction-rollers, $i$, provided within the casing on each side of the plate or bar, slotted guiding-plates, I, I', for said antifriction-roller, a brake-shoe secured to or formed integral with the plate or bar, a lever pivoted to the casing and operatively connected to the plate or bar, said lever being adapted to be acted upon by the driving-chain of the machine.

6. A chain-actuated braking mechanism, comprising in combination, a casing formed of sections, C, D, and D', securing-bolts, $d$, $d'$, $d^2$, $d^3$, and $d^4$ for securing the sections of the casing to each other and to the frame of the machine, a plate or bar, G, guided within said casing and having a slot, $h'$, a sleeve, $h$, surrounding the bolt, $d^4$, and extending through the slot, $h'$, of the plate or bar, a brake-shoe, G', secured to or formed integral with the plate or bar, G, an actuating-spring, $k$, tending to keep the plate or bar in inoperative position, slotted plates, I, I', situated one on each side of the plate or bar, antifriction-rollers, $i$, adapted to recesses in said plates, I, I', a sleeve, $e^3$, surrounding the bolt, $d^2$, a lever, E, and a plate, E', pivotally hung on said sleeve, a pin, $f$, carried by said lever and plate and forming a connecting-pivot between the plate and lever and the plate or bar, G, a pin, $e$, adapted to any one of a series of orifices, $e'$, in the lower portion of the lever, E, and a roller, $e^2$, of yielding material mounted on said pin, $e$, substantially as specified.

In witness whereof I have hereunto set my hand this 2d day of October, A. D. 1896.

EDWARD A. HINE.

Witnesses:
JOHN R. HAMILTON,
RUFUS K. McHARG.